United States Patent

Krogstad et al.

[15] 3,639,063

[45] Feb. 1, 1972

[54] INTERFERENCE FRINGE MOVEMENT DETECTOR

[72] Inventors: Reuben S. Krogstad; Victor Vali, both of Seattle, Wash.

[73] Assignee: The Boeing Company, Seattle, Wash.

[22] Filed: Mar. 6, 1970

[21] Appl. No.: 17,100

[52] U.S. Cl. ............................................. 356/106, 250/204
[51] Int. Cl. ......................................................... G01b 9/02
[58] Field of Search ........................................ 356/106–113; 250/204

[56] References Cited

UNITED STATES PATENTS

| | | | |
|---|---|---|---|
| 3,354,311 | 11/1967 | Vali et al. | 356/106 |
| 3,114,842 | 12/1963 | Davidson | 250/204 X |

*Primary Examiner*—Ronald L. Wibert
*Assistant Examiner*—Conrad Clark
*Attorney*—Glenn Orlob, Kenneth W. Thomas and Kenneth M. MacIntosh

[57] ABSTRACT

An improved fringe movement detector in which a radiation interference pattern is deflected by a galvanometer mirror to illuminate two photoelectric cells with selected portions of the interference pattern. As the interference pattern shifts, the change in output of the photoelectric detectors is differentially amplified and applied to the galvanometer coil to deflect the interference pattern back to the original or reference position on the photoelectric detectors. The magnitude of the electrical signal required to return the galvanometer mirror to the reference position is proportional to the amount of shift of the interference pattern. After a shift of a predetermined amount, reset means are used to return the galvanometer mirror to approximately its original position to illuminate the photoelectric detectors with selected portions of the next following fringe.

8 Claims, 3 Drawing Figures

INVENTORS,
REUBEN S. KROGSTAD
VICTOR VALI
BY
Kenneth M. MacIntosh
ATTORNEY

INTERFERENCE FRINGE MOVEMENT DETECTOR

BACKGROUND OF THE INVENTION

This invention relates to a fringe movement detector and measuring system that is useful for measuring the fringe shift of a radiation interference pattern such as that produced by an interferometer used for measuring relative movement between two points. As was described in U.S. Pat. No. 3,354,311 issued to the present inventors and others, interferometric measuring techniques have been applied to detecting relative movement between two points on the surface of the earth in order to measure long earth strains resulting from earth tides and other geophysical phenomena. In this application, it is extremely important that the fringe movement-measuring system be capable of extremely high resolution, long term stability, and that it be relatively insensitive to temperature variations and mechanical noise. Since these apparatus are often installed in remote locations, it is also important that the measuring apparatus have the ability of automatically recording fringe shifts and partial fringe shifts over long periods of time without manual supervision and adjustment. While many of these requirements were met by the fringe movement detector of that patent, it was discovered that the complexity of moving parts of that invention resulted in unacceptable unreliability in terms of temperature sensitivity and mechanical noise. It was soon realized, therefore, that an improved fringe movement detector measurement system was required having increased resolution, greater sensitivity, higher frequency response, and greater isolation from thermal and mechanical ambient variations.

SUMMARY OF THE INVENTION

It is therefore an object of this invention to provide an improved interference fringe shift detector.

It is another object of this invention to provide an apparatus for measuring the fringe shift of an interference pattern that has few moving parts and is relatively insensitive to temperature variations and mechanical noise.

It is another object of this invention to provide a sensitive interference fringe shift detector that is capable of detecting shifts of at least 0.001 fringe or approximately 3 angstroms.

It is yet another object of this invention to provide an improved fringe shift detector suitable for detecting minute earth strains that is capable of great sensitivity and high-frequency response.

These and other objects of this invention are obtained by an interference fringe movement detector wherein an interferometrically derived fringe pattern is deflected by a galvanometer mirror upon two photoelectric detectors such that each of the detectors is illuminated by similar but separate portions of the interference pattern. As the fringe pattern shifts, the changes in the photoelectric detector output is differentially amplified to derive an electrical signal that is connected to the coil of the galvanometer to rotate the galvanometer mirror so as to again illuminate the photoelectric detectors with the originally selected portions of the fringe pattern. After the fringe pattern has shifted a predetermined extent, means are provided for resetting the galvanometer mirror back to its original or reference position so as to illuminate each of the photoelectric detectors with selected portions of the next following fringe. Since the electrical signals applied to the galvanometer coil to maintain the selected illumination of the photoelectric detectors is proportional to the amount of shift of the fringe pattern, a recorder may be connected to the galvanometer coil circuit to record the amount of shift of the fringe pattern and to count the number of times the galvanometer mirror is reset to pick up the next following fringe element.

DESCRIPTION OF THE PREFERRED EMBODIMENT

Figure 1:
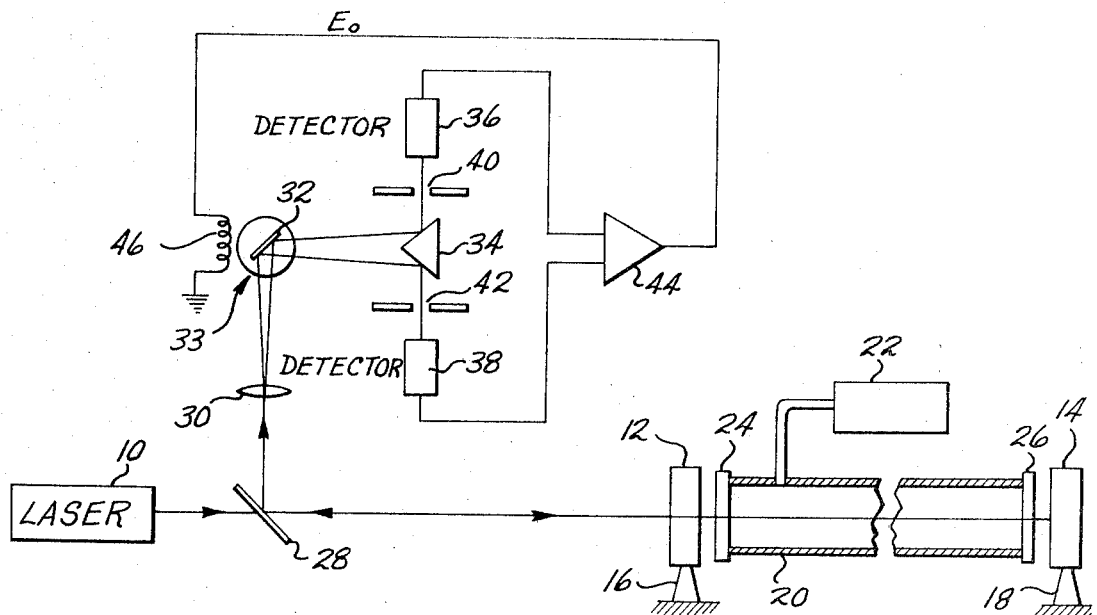
FIG. 1 is a schematic representation of the improved interference fringe movement detector of this invention as applied to an earth strain measurement system.

Referring now to FIG. 1, there is shown there an interferometric earth strain measuring system embodying the fringe movement detector of this invention. Earth strain measurements of this type are generally employed to measure the relative displacement of selected points on the surface of the earth that are separated by a considerable distance such as one kilometer or so. In these applications the radiation source used to generate the interference pattern is normally selected to be a laser since it is the only illumination source with a sufficiently long coherent length to make possible interferometric studies at these distances. And even in these instances, it is desirable that the laser exhibit a long term stability of at least 1 part in $10^{11}$. Accordingly, long term stabilized laser 10 generates a beam of monochromatic radiation that is directed to a first partially reflecting mirror 12 where a portion of the laser beam is reflected and the remainder passes through mirror 12 to be reflected from retroreflector mirror 14. Mirrors 12 and 14 are firmly anchored by support means 16 and 18 to two points on the surface of the earth between which it is desired to measure relative movement or earth strain. The distance between mirrors 12 and 14 may be any such selected as desirable for the measurement and may very well be 1 kilometer or more. The beam path between mirrors 12 and 14 is enclosed by a tube 20 which is evacuated by vacuum pump 22 to a pressure of approximately $10^{-4}$ torr to obtain a uniform density of the path length. The ends of the evacuated tube 20 are enclosed by optical flats 24 and 26, the surfaces of which are coated with an antireflective coating.

That portion of the laser beam reflected from partially reflecting mirror 12 interferes with that portion reflected from mirror 14 producing an interference pattern comprising a series of parallel light and dark lines or fringes. The light lines result from constructive interference of the light waves and the dark lines from destructive interference. Any shift or change in the distance between mirrors 12 and 14 will produce a proportional shift in the position of the interference pattern fringes.

The interference pattern is directed by mirror 28 through lens 30 which focuses the interference pattern upon mirror 32 of galvanometer 33. Galvanometer mirror 32 is positioned so that the interference pattern is projected upon beam splitter 34 which divides the interference pattern into two portions, one of which illuminates detector 36 and the other illuminates detector 38. Optical slit 40 placed in front of detector 36 is adjusted so that only a selected portion of the interference pattern falls upon detector 36. A similar optical slit 42 is also provided to control the illumination of detector 38. The electrical output signals from detectors 36 and 38 are processed by electronic circuitry generally shown at 44 which produces a control signal $E_0$ that is applied to coil 46 of galvanometer 33 which controls the positioning of the interference pattern upon detectors 36 and 38.

Figure 3:
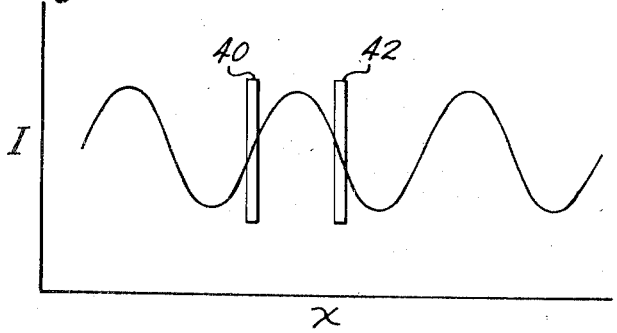
FIG. 3 is a schematic representation of the illumination of the radiation detectors by the interference pattern.

In FIG. 3 is shown a plot of the intensity, I, of a typical radiation interference pattern along a transverse direction $x$. As can be seen therein, the interference pattern comprises alternating elements of high and low intensity formed by the constructive and destructive interference of the laser beams reflected from mirrors 12 and 14. In the operation of the preferred embodiment of this invention, galvanometer mirror 32 and optical slits 40 and 42 are adjusted so that detectors 36 and 38 are illuminated only by small portions of the interference pattern selected to be equally spaced from, and straddling, an element of the pattern of minimum or maximum intensity. As shown in FIG. 3, slits 40 and 42 may be adjusted so that their spacing straddles one fringe element of the interference pattern when the pattern is in zero reference position. In certain instances, it may be desirable to have the slits straddle more than one fringe element. As the interference pattern shifts in either direction along the x axes, as shown in FIG. 3, the electrical output of one detector will increase while the output of the other will decrease. These outputs of detectors 36 and 38 are processed by control circuitry 44 which detects the difference in these detector outputs and generates a control signal, $E_0$, of sufficient magnitude and polarity which, when applied to coil 46 of galvanometer 33, will cause galvanometer mirror 32 to rotate so as to bring the interference pattern back to the zero reference position. The magnitude of the control signal, $E_0$, is therefore proportional to the amount of shift of the interference pattern and the polarity of control signal, $E_0$, is indicative of the direction of shift of the pattern.

After a predetermined degree of shift of the interference pattern has occurred, as detected by the magnitude of control signal $E_0$, control signal circuitry 44 is adapted to either disengage galvanometer coil 36 to permit galvanometer mirror 32 to return to its original position under the action of the biasing means in the galvanometer movement to lock on the next following similar fringe element, or to apply a pulse to galvanometer coil 46 which will drive galvanometer mirror 32 to pick up the next succeeding similar fringe element of the interference pattern. In this manner, very large relative displacements between the points to which mirrors 12 and 14 are attached can be measured by recording or counting the number of recycle events that have occurred. At the same time, proper recording techniques of signal $E_0$ will permit the resolution of very small movements occurring between recycle events. It is convenient to have control signal circuit means 44 to apply the recycle or reset signals to galvanometer coil 46 whenever the interference pattern has shifted one fringe distance. In this way, a direct count of the recycle events yields the number of fringe shift that has occurred. In the practice of this invention, it has been found that a resolution of 0.001 of a fringe spacing can be readily obtained. When using a helium-neon continuous wave laser radiating at a wavelength of 6,328 angstroms, this resolution represents a differential movement of approximately 3 angstroms between reflecting mirrors 12 and 14 of the interferometer. In order to obtain this type of resolution, it has been found preferable in the practice of this invention to use photoelectric cells in place of photo-multipliers for detectors 36 and 38. In addition to high resolution, this invention also offers the advantage of high frequency response with frequencies of as high as 4,000 cycles per second being readily obtained. The high-frequency response characteristics of this invention are mainly attributable to the use of a single moving element, i.e., the galvanometer mirror 32. The remaining elements of the invention, that is, detectors 36 and 38, slits 40 and 42 and beam splitter 34, remain stationary during the tracking of the interference pattern shift. In addition, galvanometer 33 is much less susceptible to temperature variations and mechanical noise than are those systems of the prior art requiring movement of the detectors and slits during the tracking of the fringe pattern shift.

Figure 2:
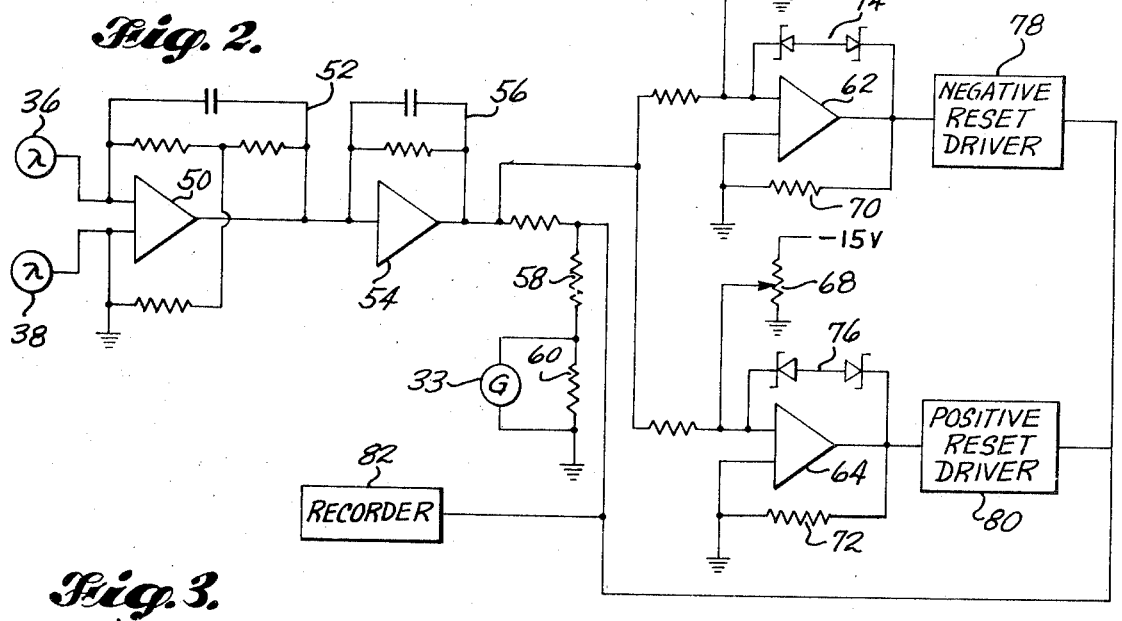
FIG. 2 is a circuit diagram of the electronic circuitry that may be used to implement the fringe movement detector system of FIG. 1.

Referring now to FIG. 2, there is shown an electronic circuit that may be used for generating control signal $E_0$ which is applied to galvanometer coil 46 to track the interference pattern shift and to recycle the galvanometer mirror 32 back to its initial position. As shown in that figure, the outputs of detectors 36 and 38 are connected to current difference operational amplifier 50 having a conventional T resistance feedback network 52. The output of operational amplifier 50 is connected to operational amplifier 54 having a conventional RC feedback network 56 which provides a signal of sufficient strength to drive galvanometer 33 through a series shunt network comprising resistors 58 and 60 which decreases the effective amplifier noise. The output of operational amplifier 54 is also connected to two voltage comparator operational amplifiers 62 and 64 wherein it is compared with a reference signal of opposite polarity derived from voltage divider networks 66 and 68. A small amount of positive feedback is provided around each amplifier 62 and 64 through resistors 70 and 72 to provide hysteresis and prevent chattering due to input noise. Each comparator operational amplifier 62 and 64 have back to back zener diode networks 74 and 76 to prevent saturation and to clamp the output states of those amplifiers to approximately plus or minus 7.3 volts. When the inputs to comparator operational amplifiers 62 and 64, derived from driver operational amplifier 54, exceeds the respective reference voltages obtained from voltage divider networks 66 and 68, the operational amplifiers 62 and 64 go from one state to the other, thus actuating reset drivers 78 or 80. Reset drivers 78 and 80 are monostable multivibrators that, when actuated, reset the galvanometer mirror 32 to its initial position by momentarily shorting out galvanometer coil 46. Alternatively, reset drivers 78 and 80 may be cross coupled to produce an impulse signal which when activated is applied to galvanometer coil 46 to drive the galvanometer over the fringe element of the shifting interference pattern that it had been tracking back to pick up the next following fringe element. Recorder 82 which may be a strip chart recorder or a fringe counter or a combination of both can be conveniently attached to the circuit as shown in FIG. 2 to monitor the magnitude and polarity of the control signal that is being continuously applied to galvanometer 33 and to indicate the number of reset cycles that have been applied to galvanometer 33 by reset drivers 78 and 80.

What has been provided, therefore, is an improved apparatus for detecting and measuring the shift of a laser generated interference pattern by deflecting that pattern by means of a galvanometer mirror to maintain constant illumination upon two photoelectric detectors. As the pattern shifts, the change in output of the photoelectric detector is sensed in magnitude and polarity to generate a control signal which is fed back to the galvanometer coil to maintain the illumination of the photoelectric detectors at the preset condition. The magnitude of the control signal is proportional to the degree of shift of the interference pattern. After the interference pattern has shifted a predetermined amount, such as one fringe displacement, means are provided for recycling the galvanometer mirror back to its original position wherein the tracking procedure is repeated during the next fringe movement. This detection measurement system employs a minimum of moving parts resulting in high resolution and sensitivity, high-frequency response, and insensitivity to temperature variations and mechanical noise. It is to be understood that while the invention has been described herein with reference to specific embodiments, it is intended that any modifications which become obvious to a person skilled in the arts from the teachings hereof will be encompassed by the following claims.

We claim:

1. An apparatus for measuring the shift of a radiation interference pattern having a series of similar portions comprising:
    a. first and second radiation detectors for generating first and second electrical signals when illuminated by the radiation;
    b. optical means positioned to receive the radiation interference pattern and operable to maintain substantially constant illumination of said detectors by selected portions of the radiation interference pattern, in response to an electrical control signal, during the shift of the radiation interference pattern;
    c. control signal generating means responsive to the first and second electrical signals and generating an electrical control signal proportional to the shift of the radiation interference pattern; and
    d. recycle means, electrically coupled to said control signal generating means and to said optical means, responsive to a predetermined magnitude of the electrical control signal to cause said optical means to maintain substantially constant illumination of said detectors by succeeding similar selected portions of the radiation interference pattern.

2. The apparatus as claimed in claim 1 wherein said optical means comprises:
   a. galvanometer means including an electromagnetic coil coupled to said control signal generating means and a radiation deflection means positioned to receive the radiation interference pattern and moveably responsive to the energization of said coil by the control signal to direct the radiation interference pattern toward said first and second radiation detectors; and
   b. image definition means positioned to receive the radiation interference pattern from said radiation deflection means and adjustable to permit only selected portions of the radiation interference pattern to illuminate said first and second radiation detectors.

3. The apparatus as claimed in claim 2 wherein said image definition means comprises:
   a. beamsplitter means positioned to receive the radiation interference pattern from said radiation deflection means and adapted to direct an image of the radiation interference pattern to each of the first and second radiation detectors; and
   b. aperture defining means positioned between said beamsplitter means and said first and second radiation detectors adjustably adapted to pass selected portions of the radiation interference pattern images to said first and second radiation detectors.

4. An apparatus for measuring the shift of a radiation interference pattern having a series of successive fringe elements of varying intensity comprising:
   a. first and second radiation detectors for generating first and second electrical signals when illuminated by the radiation;
   b. optical means including moveable deflection means positioned to receive the radiation interference pattern and moveably adapted to maintain substantially constant illumination of said detectors by selected elements of the radiation interference pattern, in response to an electrical control signal, during a predetermined shift of the radiation interference pattern from a reference position;
   c. control signal generating means responsive to the first and second electrical signals and generating an electrical control signal proportional to the shift of the radiation interference pattern from the reference position; and
   d. recycle means, electrically coupled to said control signal generating means and to said optical means, operative after the predetermined shift of the radiation interference pattern from the reference position to move said deflection means to illuminate said radiation detectors by succeeding similar elements of the radiation interference pattern at a new reference position.

5. The apparatus as claimed in claim 4 wherein said optical means comprises:
   a. galvanometer means including an electromagnetic coil coupled to said control signal generating means and a mirror positioned to receive the radiation interference pattern and rotatably responsive to the energization of said coil by the control signal to direct the radiation interference pattern toward said radiation detectors;
   b. beamsplitter means positioned to receive the radiation interference pattern from said mirror and adapted to direct an image of the radiation interference pattern to each of the radiation detectors; and
   c. aperture defining means positioned between said beamsplitter means and said radiation detectors adjustably adapted to pass selected portions of the radiation interference pattern images to illuminate said radiation detectors.

6. The apparatus as claimed in claim 5 wherein said aperture defining means are adjusted to provide an increased intensity of illumination of one radiation detector and a decreased intensity of illumination of the other radiation detector with a shift of the radiation interference pattern from the reference position.

7. An apparatus for measuring the shift of a radiation interference pattern having fringe elements of minimum and maximum intensity formed by destructive and constructive interference comprising:
   a. first and second radiation detectors for generating first and second electrical signals when illuminated by the radiation;
   b. rotatable deflection means intercepting the radiation interference pattern and rotatably positioned to illuminate said detectors with selected portions of the radiation interference pattern between different adjacent elements of minimum and maximum intensity;
   c. control signal means including a difference amplifier connected to said detectors and generating a control signal proportional to the change in the first and second electrical signals due to the shift in the radiation interference pattern;
   d. means for rotating said deflection means responsive to the control signal to restore the illumination of the detectors with the selected portions of the radiation interference pattern during a predetermined shift of the pattern;
   e. signal output means connected to said control signal means for providing an output signal proportional to the rotational displacement of said deflection means; and
   f. recycle means, electrically connected to said control signal means and to said means for rotating said deflection means, operative after the predetermined shift of the pattern to rotatably position said deflection means to illuminate said detectors with similarly selected next following portions of the radiation interference pattern.

8. The apparatus as claimed in claim 7 wherein the predetermined shift of the radiation interference pattern corresponds to one fringe shift.

* * * * *